US012373112B2

(12) United States Patent
Dong et al.

(10) Patent No.: US 12,373,112 B2
(45) Date of Patent: Jul. 29, 2025

(54) MAPPED RAID CONFIGURATION WITH MULTIPLE DISK GROUPS AND A SHARED POOL OF HOT SPARE EXTENTS

(71) Applicant: Dell Products L.P., Round Rock, TX (US)

(72) Inventors: Hailan Dong, Chengdu (CN); Si Zhang, Chengdu (CN); Chi Chen, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 240 days.

(21) Appl. No.: 17/987,370

(22) Filed: Nov. 15, 2022

(65) Prior Publication Data

US 2024/0143189 A1    May 2, 2024

(30) Foreign Application Priority Data

Oct. 28, 2022    (CN) .......................... 202211334992.2

(51) Int. Cl.
*G06F 3/06*    (2006.01)

(52) U.S. Cl.
CPC .......... *G06F 3/0619* (2013.01); *G06F 3/0647* (2013.01); *G06F 3/0653* (2013.01); *G06F 3/0689* (2013.01); *G06F 2212/262* (2013.01)

(58) Field of Classification Search
CPC .... G06F 3/0619; G06F 3/0647; G06F 3/0653; G06F 3/0689
See application file for complete search history.

(56) References Cited

U.S. PATENT DOCUMENTS

| 5,941,994 A * | 8/1999 | DeKoning | G11B 20/1833 |
| | | | 714/48 |
| 10,095,585 B1 * | 10/2018 | Proulx | G06F 11/1088 |
| 2007/0088990 A1 * | 4/2007 | Schmitz | G11B 20/20 |
| 2010/0205372 A1 * | 8/2010 | Daikokuya | G06F 3/0632 |
| | | | 714/E11.089 |

(Continued)

OTHER PUBLICATIONS

NVM Express, NVM Express, Revision 1.3, NVM Express, May 1, 2017, 282 pages.

(Continued)

*Primary Examiner* — Tim T Vo
*Assistant Examiner* — Janice M. Girouard
(74) *Attorney, Agent, or Firm* — Ryan, Mason & Lewis, LLP

(57) ABSTRACT

An apparatus comprises a processing device configured to maintain, for a storage system implementing a mapped redundant array of independent disks (RAID) configuration including disk groups providing RAID groups comprising data and hot spare extents, a shared pool of hot spare extents comprising first and second sets of hot spare extents from first and second ones of the disk groups. The processing device is further configured to detect failure of a disk in the first disk group, to determine whether available ones of the first set of hot spare extents provide sufficient storage capacity for rebuilding the failed disk and, responsive to determining that available ones of the first set of hot spare extents do not provide sufficient storage capacity for rebuilding the failed disk, to rebuild the failed disk utilizing one or more of the second set of hot spare extents in the shared pool of hot spare extents.

20 Claims, 14 Drawing Sheets

(56) References Cited

U.S. PATENT DOCUMENTS

2020/0341845 A1* 10/2020 Gao .................. G06F 9/5011

OTHER PUBLICATIONS

Dell EMC, "Dell EMC Unity: FAST Technology Overview," Technical White Paper, Feb. 2021, 38 pages.
Dell Technologies, "Dell EMC VMAX All Flash: Family Overview," Technical White Paper, Sep. 2020, 40 pages.
Dell Technologies, "Dell EMC Unity: Unisphere Overview," Technical White Paper, Feb. 2020, 41 pages.
Emc2, "FAST.X with EMC CloudArray," White Paper, Sep. 2015, 11 pages.
Dell EMC "DELL EMC VMAX All Flash and VMAX3: Reliability, Availability, and Serviceability," Technical White Paper, Dec. 2020, 57 pages.
Dell EMC, "Dell EMC VMAX3 Family," Data Sheet, Nov. 2016, 8 pages.
Dell Technologies, "Dell Unity: Dynamic Pools," Technical White Paper, Apr. 2022, 43 pages.
dell.com, "Double Faults and Punctures in RAID Arrays," https://www.dell.com/support/kbdoc/en-us/article/lkbprint?ArticleNumber=000139251&AccessLevel=10&Lang=en, Article No. 000139251, Mar. 25, 2022, 7 pages.

\* cited by examiner

601

| EXTREME PERFORMANCE STORAGE TIER | | | |
|---|---|---|---|
| DRIVE TYPE | RAID TYPE | STRIPE WIDTH | # OF DRIVES |
| SAS FLASH 2 | RAID 5 | 4+1 | 8 |
| SAS FLASH 3 | RAID 5 | 12+1 | 30 |
| HOT SPARE CAPACITY: 1/32 | | | |

603

| PERFORMANCE STORAGE TIER | | | |
|---|---|---|---|
| DRIVE TYPE | RAID TYPE | STRIPE WIDTH | # OF DRIVES |
| SAS | RAID 5 | 12+1 | 165 |
| HOT SPARE CAPACITY: 1/32 | | | |

605

| CAPACITY STORAGE TIER | | | |
|---|---|---|---|
| DRIVE TYPE | RAID TYPE | STRIPE WIDTH | # OF DRIVES |
| NL-SAS | RAID 6 | 4+2 | 7 |
| HOT SPARE CAPACITY: 1/32 | | | |

FIG. 6

MAPPED RAID CONFIGURATION WITH MULTIPLE DISK GROUPS AND A SHARED POOL OF HOT SPARE EXTENTS

RELATED APPLICATION

The present application claims priority to Chinese Patent Application No. 202211334992.2, filed on Oct. 28, 2022 and entitled "Mapped Raid Configuration with Multiple Disk Groups and a Shared Pool of Hot Spare Extents," which is incorporated by reference herein in its entirety.

FIELD

The field relates generally to information processing, and more particularly to storage in information processing systems.

BACKGROUND

Storage arrays and other types of storage systems are often shared by multiple host devices over a network. Applications running on the host devices each include one or more processes that perform the application functionality. Such processes issue input/output (IO) operation requests for delivery to the storage systems. Storage controllers of the storage systems service such requests for IO operations. In some information processing systems, multiple storage systems may be used to form a storage cluster.

SUMMARY

Illustrative embodiments of the present disclosure provide techniques for implementing a mapped redundant array of independent disks (RAID) configuration with multiple disk groups and a shared pool of hot spare extents.

In one embodiment, an apparatus comprises at least one processing device comprising a processor coupled to a memory. The at least one processing device is configured to perform the step of maintaining, for a storage system implementing a mapped RAID configuration including two or more disk groups each providing one or more RAID groups comprising one or more data extents and one or more hot spare extents, a shared pool of hot spare extents, the shared pool of hot spare extents comprising a first set of hot spare extents on one or more disks in a first one of the two or more disk groups and a second set of hot spare extents on one or more disks in a second one of the two or more disk groups. The at least one processing device is further configured to perform the steps of detecting failure of a given disk in the first disk group, determining whether available ones of the first set of hot spare extents in the shared pool of hot spare extents provide sufficient storage capacity for rebuilding the given disk, responsive to determining that available ones of the first set of hot spare extents in the shared pool of hot spare extents do not provide sufficient storage capacity for rebuilding the given disk, selecting one or more of the second set of hot spare extents for rebuilding the given disk, and rebuilding the given disk utilizing at least the selected one or more of the second set of hot spare extents in the shared pool of hot spare extents.

These and other illustrative embodiments include, without limitation, methods, apparatus, networks, systems and processor-readable storage media.

BRIEF DESCRIPTION OF THE DRAWINGS

FIG. 6 shows tables with configuration information for redundant array of independent disk groups of a storage pool in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
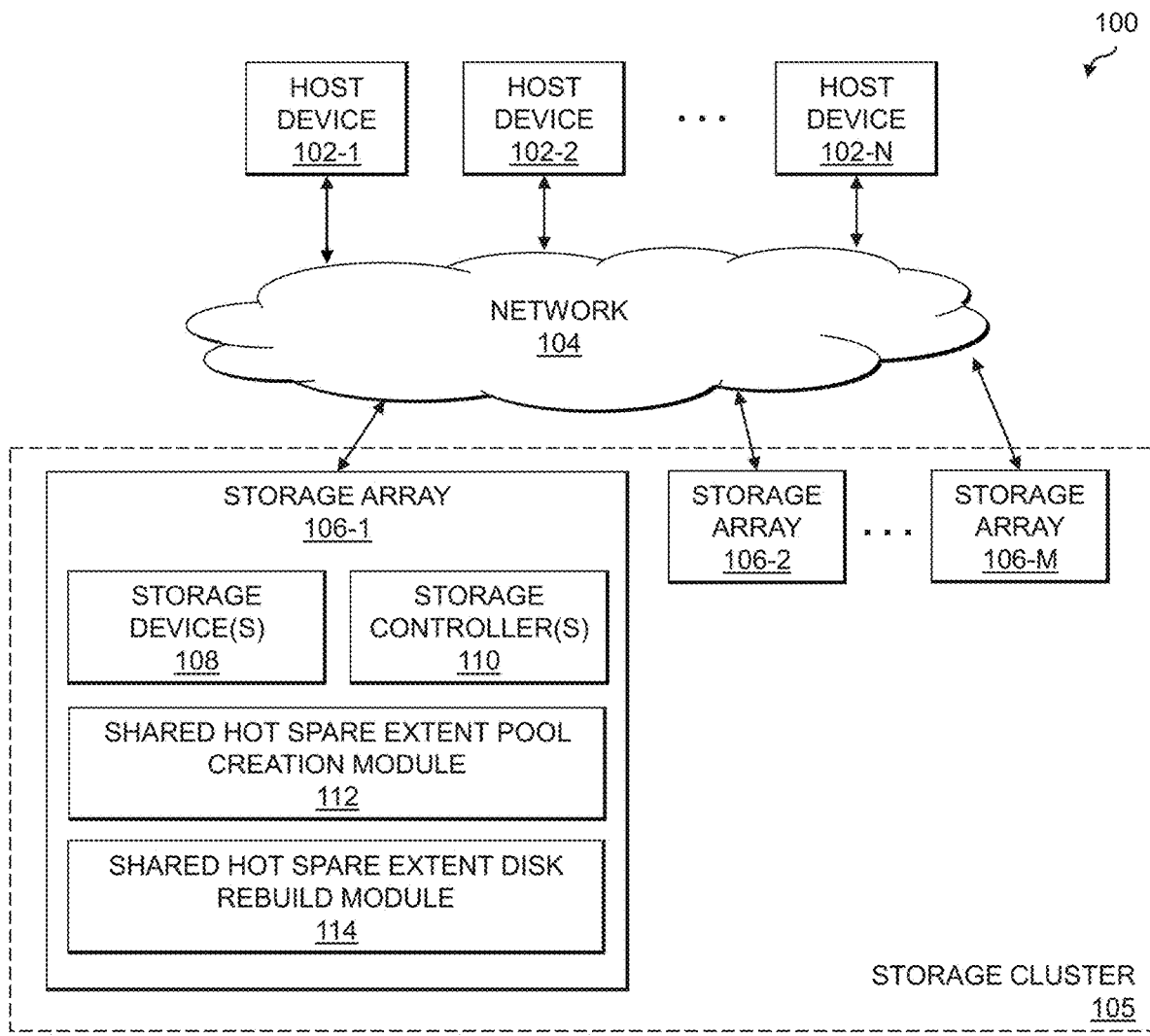
FIG. 1 is a block diagram of an information processing system configured for implementing a mapped redundant array of independent disks (RAID) configuration with multiple disk groups and a shared pool of hot spare extents in an illustrative embodiment.

FIG. 1 shows an information processing system 100 configured in accordance with an illustrative embodiment to provide functionality for implementing a mapped redundant array of independent disks (RAID) configuration with multiple disk groups and a shared pool of hot spare extents. The information processing system 100 comprises one or more host devices 102-1, 102-2, . . . 102-N (collectively, host devices 102) that communicate over a network 104 with one or more storage arrays 106-1, 106-2, . . . 106-M (collectively, storage arrays 106). The network 104 may comprise a storage area network (SAN).

The storage array 106-1, as shown in FIG. 1, comprises a plurality of storage devices 108 each storing data utilized by one or more applications running on the host devices 102. The storage devices 108 are illustratively arranged in one or more storage pools. The storage array 106-1 also comprises one or more storage controllers 110 that facilitate input/output (IO) processing for the storage devices 108. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system.

The host devices 102 illustratively comprise respective computers, servers or other types of processing devices capable of communicating with the storage arrays 106 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102. These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input/output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

In the information processing system 100 of FIG. 1, the storage arrays 106 are assumed to be part of a storage cluster 105 (e.g., where the storage arrays 106 may be used to implement one or more storage nodes in a cluster storage system comprising a plurality of storage nodes interconnected by one or more networks), and the host devices 102 are assumed to submit IO operations (e.g., as part of storage workloads of one or more applications running on the host devices 102) to be processed by the storage cluster 105.

In some embodiments, the storage cluster 105 or at least one of the storage arrays 106 that are part of the storage cluster 105 are assumed to provide a storage pool that utilizes a mapped RAID configuration with multiple disk groups. It should be noted that the term "disk" as used herein is intended to be construed broadly to encompass any type of storage drive or device, including SSDs, and is not limited to HDDs or other types of disk-based storage devices. At least one of the storage controllers of the storage arrays 106 (e.g., the storage controller 110 of storage array 106-1) is assumed to implement functionality for pooling hot spare extents from the multiple disk groups that are part of the storage pool. This advantageously enables recovery of an x+1th failed disks, in a first disk group whose RAID configuration supports x simultaneous disk failures, following rebuild of the x failed disks but before new disks are added to replace the x failed disks. Such functionality is provided via a shared hot spare extent pool creation module 112 and a shared hot spare extent disk rebuild module 114. The shared hot spare extent pool creation module 112 is configured to create a shared hot spare extent pool which includes one or more hot spare extents from each of two or more disk groups that are part of the storage pool. The shared hot spare extent disk rebuild module 114 is configured to enable sharing of the hot spare extents that are part of the shared hot spare extent pool among the multiple disk groups that are part of the storage pool, such that the hot spare extents on disks that are part of a second disk group may be used in the event that there are no or insufficient hot spare extents on disks that are in the first disk group. It should be noted that not all disk groups that are part of a storage pool are required to make their hot spare extents available in the shared hot spare extent pool. For example, different disk groups may be associated with disks that are part of different storage tiers in the storage system. In some embodiments, disks that are part of one or more of the highest performance storage tiers may not contribute their hot spare extents to the shared hot spare extent pool while disks that are part of one or more lower performance storage tiers may contribute their hot spare extents to the shared hot spare extent pool. This may be desired, for example, to not "waste" hot spare extents from the highest performance disks for rebuilding failed disks that are part of lower performance storage tiers. It should be further noted that, even if a particular disk group does not contribute hot spare extents to the shared hot spare extent pool, that disk group may still utilize hot spare extents from the shared hot spare extent pool if needed. Continuing with the example above, the disk group which includes disks in the highest performance storage tier may not contribute hot spare extents to the shared hot spare extent pool, but may still utilize hot spare extents in the shared hot spare extent pool (e.g., contributed by disk groups including disks in lower performance storage tiers) if needed.

Although in the FIG. 1 embodiment the shared hot spare extent pool creation module 112 and the shared hot spare extent disk rebuild module 114 are shown as being implemented internal to the storage array 106-1 and outside the storage controllers 110, in other embodiments one or both of the shared hot spare extent pool creation module 112 and the shared hot spare extent disk rebuild module 114 may be implemented at least partially internal to the storage controllers 110 or at least partially outside the storage array 106-1, such as on one of the host devices 102, one or more other ones of the storage arrays 106-2 through 106-M, on one or more servers external to the host devices 102 and the storage arrays 106 (e.g., including on a cloud computing platform or other type of information technology (IT) infrastructure), etc. Further, although not shown in FIG. 1, other ones of the storage arrays 106-2 through 106-M may implement respective instances of one or both of the shared hot spare extent pool creation module 112 and the shared hot spare extent disk rebuild module 114.

At least portions of the functionality of the shared hot spare extent pool creation module 112 and the shared hot spare extent disk rebuild module 114 may be implemented at least in part in the form of software that is stored in memory and executed by a processor.

As noted above, the storage arrays 106 in some embodiments are assumed to be part of the storage cluster 105. The storage cluster 105 is assumed to provide or implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

It should be appreciated that a multi-tier storage system may include more than two storage tiers, such as one or more "performance" tiers and one or more "capacity" tiers, where the performance tiers illustratively provide increased IO performance characteristics relative to the capacity tiers and the capacity tiers are illustratively implemented using relatively lower cost storage than the performance tiers. There may also be multiple performance tiers, each providing a different level of service or performance as desired, or multiple capacity tiers.

The host devices 102 and storage arrays 106 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage arrays 106 may be implemented on respective distinct processing platforms, although numerous other arrangements are possible. For example, in some embodiments at least portions of one or more of the host devices 102 and one or more of the storage arrays 106 are implemented on the same processing platform. One or more of the storage arrays 106 can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement 10 operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 in some embodiments may be implemented as part of a cloud-based system.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. The storage arrays 106 may be implemented at least in part in the first geographic location, the second geographic location, and one or more other geographic locations. Thus, it is possible in some implementations of the system 100 for different ones of the host devices 102 and the storage arrays 106 to reside in different data centers.

Numerous other distributed implementations of the host devices 102 and the storage arrays 106 are possible. Accordingly, the host devices 102 and the storage arrays 106 can also be implemented in a distributed manner across multiple data centers.

Additional examples of processing platforms utilized to implement portions of the system 100 in illustrative embodiments will be described in more detail below in conjunction with FIGS. 12 and 13.

It is to be understood that the particular set of elements shown in FIG. 1 for implementing a mapped RAID configuration with multiple disk groups and a shared pool of hot spare extents is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for implementing a mapped RAID configuration with multiple disk groups and a shared pool of hot spare extents will now be described in more detail with reference to the flow diagram of FIG. 2. It is to be understood that this particular process is only an example, and that additional or alternative processes for implementing a mapped RAID configuration with multiple disk groups and a shared pool of hot spare extents may be used in other embodiments.

In this embodiment, the process includes steps 200 through 208. These steps are assumed to be performed by the shared hot spare extent pool creation module 112 and the shared hot spare extent disk rebuild module 114. The process begins with step 200, maintaining, for a storage system implementing a mapped RAID configuration including two or more disk groups each providing one or more RAID groups comprising one or more data extents and one or more hot spare extents, a shared pool of hot spare extents. The shared pool of hot spare extents comprises a first set of hot spare extents on one or more disks in a first one of the two or more disk groups and a second set of hot spare extents on one or more disks in a second one of the two or more disk groups.

Failure of a given disk in the first disk group is detected in step 202. In step 204, a determination is made as to whether available ones of the first set of hot spare extents in the shared pool of hot spare extents provide sufficient storage capacity for rebuilding the given disk. Responsive to determining that available ones of the first set of hot spare extents in the shared pool of hot spare extents do not provide sufficient storage capacity for rebuilding the given disk, one or more of the second set of hot spare extents are selected in step 206 for rebuilding the given disk. The given disk is rebuilt in step 208 utilizing at least the selected one or more of the second set of hot spare extents in the shared pool of hot spare extents.

The first disk group may provide storage for a first one of a plurality of storage tiers of the storage system, and the second disk group may provide storage for a second one of the plurality of storage tiers of the storage system. In some embodiments, the second storage tier of the storage system provides a higher level of performance than the first storage tier and step 206 is further responsive to determining that the shared pool of hot spare extents does not include any available hot spare extents on any of the two or more disk groups providing storage for one or more of the plurality of storage tiers of the storage system providing a higher level of performance than the first storage tier and a lower level of performance than the second storage tier. In other embodiments, the second storage tier of the storage system provides a lower level of performance than the first storage tier and step 206 is further responsive to determining that the shared pool of hot spare extents does not include any available hot spare extents on any of the two or more disk groups providing storage for one or more of the plurality of storage tiers of the storage system providing a lower level of performance than the first storage tier and a higher level of performance than the second storage tier.

Figure 2:
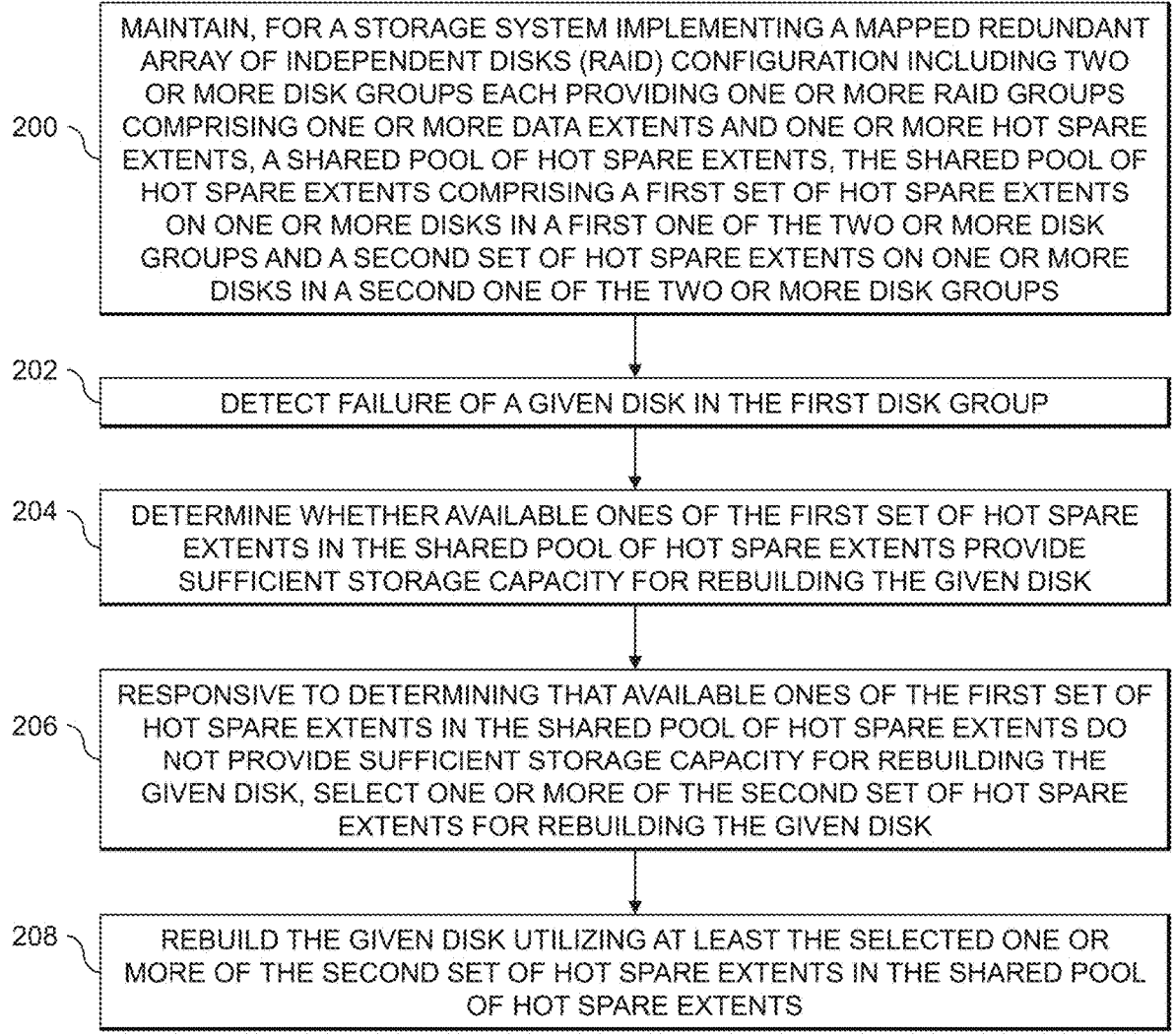
FIG. 2 is a flow diagram of an exemplary process for implementing a mapped RAID configuration with multiple disk groups and a shared pool of hot spare extents in an illustrative embodiment.

The FIG. 2 process may further include detecting addition of one or more disks to the first disk group, and migrating rebuilt data stored on the selected one or more of the second set of hot spare extents in the shared pool of hot spare extents to the one or more disks added to the first disk group.

Step 208 in some embodiments includes utilizing at least one available one of the first set of hot spare extents in the shared pool of hot spare extents. Step 208 in some embodiments may alternatively or further utilize at least one of a third set of hot spare extents on one or more disks in a third one of the two or more disk groups. The third disk group may provide storage for a third one of the plurality of storage tiers of the storage system.

In some embodiments, the first disk group comprises one or more RAID groups configured to recover a designated number of simultaneous disk failures. Step 202 may include detecting failure of the given disk (i) following rebuild of the designated number of failed disks in the first disk group and (ii) prior to replacement of the designated number of failed disks in the first disk group of the storage system.

The two or more disk groups may be arranged in two or more extent pools, the two or more extent pools providing different storage system performance. The two or more extent pools may be associated with different ones of a plurality of storage tiers of the storage system Storage systems may provide a storage pool with many different storage devices or disks, where the disks may be divided into different disk groups which are managed using mapped RAID technology. Within each disk group, each disk may be divided into disk extents, where some of the disk extents are allocated for data and others are allocated as "hot spares." Mapped RAID technology allows users to use all disks for storage provisioning (e.g., rather than reserving separate or dedicated hot spare disks), and can thus lead to more full usage of all the disks and provisioning of storage on all of the disks. In conventional approaches, the hot spare extents are isolated among the different disk groups, meaning that hot spare extents for a given disk group (e.g., disk group A) cannot be used for any other disk group (e.g., disk group B). Illustrative embodiments provide technical solutions for enabling a shared pool of hot spare extents in mapped RAID storage systems, where disks of the storage system offer a certain proportion of their capacities for use as hot spare extents, and where any disk group can use the hot spare extents (e.g., from disks of that disk group and disks of other disk groups) for data rebuilding operations (e.g., in response to disk faults in that disk group). The technical solutions can thus advantageously reduce the risk of data unavailability.

Mapped RAID technology divides the available capacity of disks into pieces called disk extents, where different disk extents of a given disk can be associated with different RAID groups and may be used to create RAID extents. Compared with traditional RAID, mapped RAID has a number of advantages. Such advantages include reducing rebuild time for failed disks by adding parallelism for disks used in the rebuild process, allowing rebuild performance to increase as disk counts increase, and improving storage provisioning. Such advantages also include reducing the cost of storage (e.g., the cost per gigabyte (GB)) by allowing storage pool creation and expansion to be based on the desired capacity (e.g., including expanding a storage pool one disk at a time) instead of having expansion be RAID group based. Mapped RAID also provides advantages in simplifying hot spare management by not requiring dedicated spare disks (e.g., requiring a minimum number of "unused" disks for each disk type and capacity), and improving flash wear and array performance by distributing hot spare capacity across the disks in a storage pool.

For mapped RAID groups with reserved hot spare extents with a special ratio in a disk group, if one disk in the disk group is in failure then the data in the failed disk will be rebuilt to the hot spare extents of that disk group. During rebuild, and until a new disk is added or made available, then the disk related RAID extents will be in a degraded status. If there is another disk failure in the disk group (e.g., while the disk group is in the degraded status), then a Double Faulted RAID Group (DFRG) condition occurs where data in the disk group may be lost and cannot be recovered, leading to data unavailability (DU) and/or data loss (DL).

Figure 3:
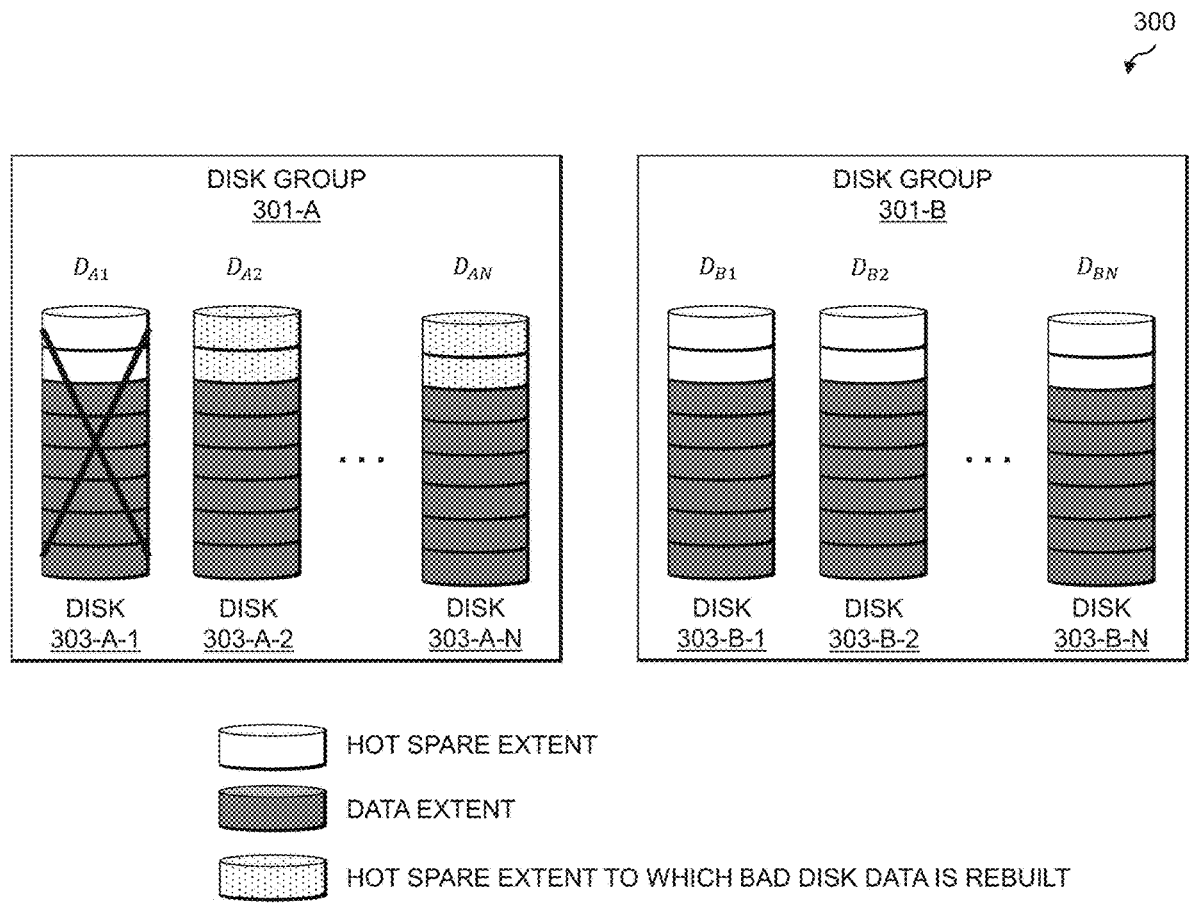
FIG. 3 shows a configuration of disk groups with isolated hot spare extents in an illustrative embodiment.

As discussed above, mapped RAID technology allows users to use all disks in a storage system for storage provisioning without reserving dedicated hot spare disks. Thus, all disks are used more fully and can be used for provisioning storage. In conventional approaches, hot spare extents are isolated among the disk groups of a storage pool. FIG. 3 shows a storage system 300 configured with disk groups 301-A and 301-B (collectively, disk groups 301). The disk groups 301 utilize a RAID 5 configuration, though this is not a requirement. The disk group 301-A, also referred to as disk group A or $DG_A$, includes a set of disks 303-A-1, 303-A-2, . . . 303-A-N (collectively, disks 303-A) which are also referred to as disks $D_{A1}$, $D_{A2}$, . . . $D_{AN}$. The disk group 301-B, also referred to as disk group B or DG B, includes a set of disks 303-B-1, 303-B-2, . . . 303-B-N (collectively, disks 303-B) which are also referred to as disks $D_{B1}$, $D_{B2}$, . . . $D_{BN}$. As shown in FIG. 3, each of the disks 303-A and 303-B (collectively, disks 303) includes a set of data extents and a set of hot spare extents. FIG. 3 more particularly shows a scenario in which the disk $D_{A1}$ is in failure, and where the data of the disk $D_{A1}$ is rebuilt using the hot spare extents of disks $D_{A2}$ through $D_{AN}$. The data rebuild process may take a significant amount of time (e.g., the disk rebuild may last hours).

Figure 4:
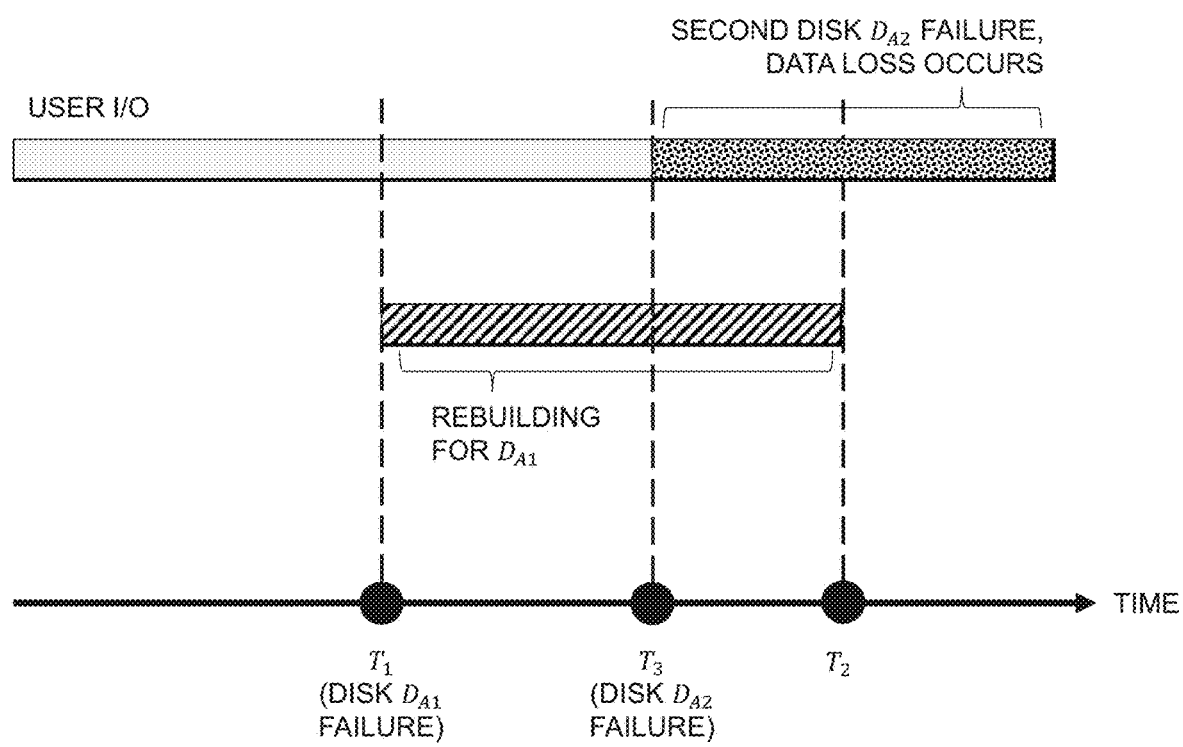
FIG. 4 shows a timing diagram plot of disk failure during rebuild of another disk in a disk group with isolated hot spare extents in an illustrative embodiment.

In the storage system 300, there are different situations which can result in DU and/or DL. FIG. 4 shows a timing diagram plot 400 illustrating one such scenario, where a second disk failure occurs during the rebuilding time window of a first failed disk. In the plot 400, the disk $D_{A1}$ fails at time $T_1$, and has a rebuilding time window $T_2-T_1$. Here, the disk $D_{A2}$ fails at time $T_3$ which falls within the rebuilding time window for disk $D_{A1}$. This results in DL for the disk group $DG_A$, which can significantly impact end users (e.g., due to loss of customer data). While mapped RAID technology can help to shorten the rebuilding time window $T_2-T_1$, the DFRG scenario of FIG. 4 (e.g., where a second disk failure happens while a first failed disk is being rebuilt) can still occur as it is not possible to completely eliminate the rebuilding time window. It should be noted that the scenario of FIG. 4 assumes that a RAID 5 configuration is used where there is only enough hot spare capacity to recover a single disk failure. If another RAID configuration is used, such as a RAID 6 configuration, there may be hot spare capacity to recover multiple simultaneous disk failures. Even with the capacity to recover from multiple simultaneous disk failures, there is still the possibility that too many simultaneous disk failures occur resulting in the scenario of FIG. 4. In other words, for a storage system that can handle x simultaneous disk failures, the failure of an x+1th disk during the rebuild time for the x disks results in the FIG. 4 scenario.

Figure 5:
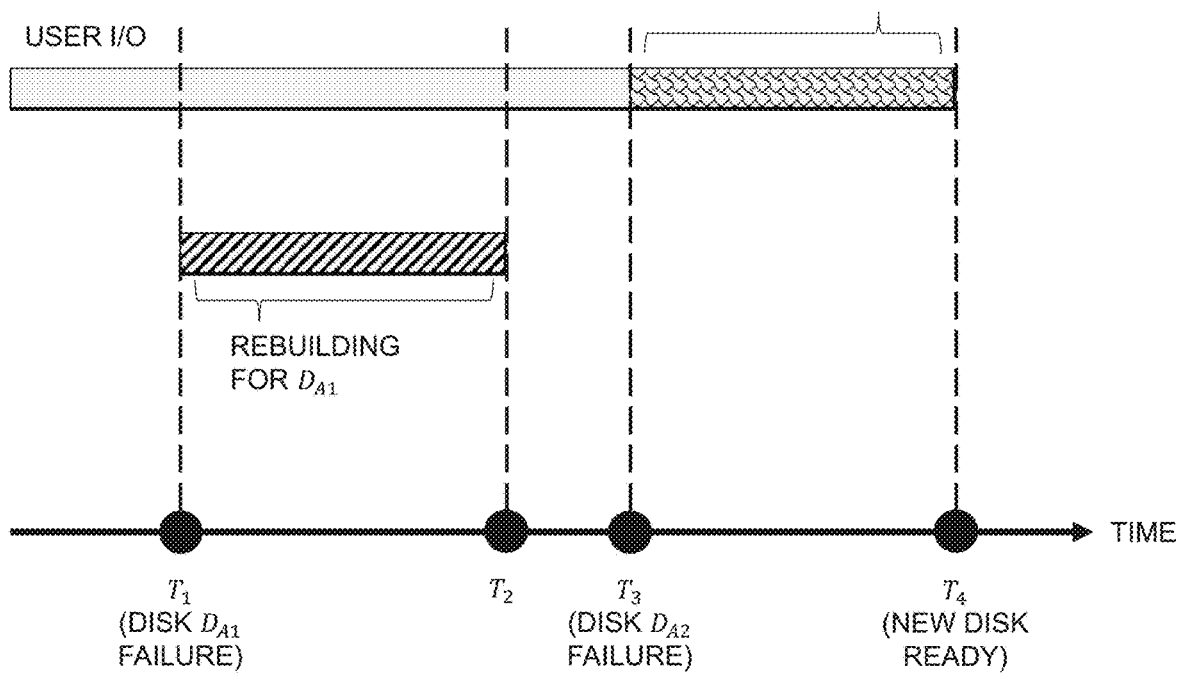
FIG. 5 shows a timing diagram plot with disk failure before a new disk is ready for a disk group with isolated hot spare extents in an illustrative embodiment.

FIG. 5 shows a timing diagram plot 500 illustrating another scenario which can result in DU and/or DL, where a second disk failure occurs outside the rebuilding time window of a first failed disk, but before a new disk is ready to replace the first failed disk. In the plot 500, the disk $D_{A1}$ fails at time $T_1$, and has a rebuilding time window $T_2-T_1$. Here, the disk $D_{A2}$ fails at time $T_3$ which falls outside the rebuilding time window for disk $D_{A1}$, but before a time $T_4$ when a new disk is ready to replace the first failed disk $D_{A1}$. After the failed disk $D_{A1}$ rebuild is done at time $T_2$, if in the storage system there is no extra disk to replenish disk group $DG_A$, then the disk group DG A operates in a degraded status (e.g., without enough hot spare extents to recover a failed disk) until the new disk is ready at time $T_4$. Even if a very quick process is used for bad or failed disk replacement, there will still be some non-zero time window $T_4-T_2$ where the disk group DG A operates in the degraded status. There may be unpredictable circumstances which lengthen the new disk delivery time (e.g., which delay time $T_4$, such as delays in shipping a disk to a target location, supply chain issues, etc.). During the time window $T_4-T_2$, the disk group DG A is not robust enough to afford or handle an extra disk (e.g., $D_{A2}$) failure before the new disk ready time $T_4$. If the second disk $D_{A2}$ fails at the time $T_3$ (after $T_2$ and before $T_4$) the disk group DG A will have DU which can impact end users.

As a storage system ages, the possibility of multiple disk failures occurring increases and the impact also increases (e.g., as more user data may be stored the longer a storage system is used). Thus, it is important to provide technical solutions for avoiding or reducing the possibility of the scenarios illustrated in FIGS. 4 and 5. Illustrative embodiments provide a technical solution for a shared hot spare extent pool for a storage pool implementing mapped RAID technology. Thus, the technical solutions offer more disks to choose from for data rebuilding without adding disks to a storage system. In a storage system with multiple disk groups, the shared hot spare extents can improve the storage system's reliability (e.g., by reducing the DFRG ratio). The technical solutions can increase the available hot spare capacity in a storage system without adding any more disks to the storage system. As described below, the technical solutions described herein provide significant reliability improvements relative to storage systems which use isolated hot spare extents.

In a mapped RAID design, disk extent pools manage all of the disks and extents in RAID groups. The disk extent pools are built based on disk types. FIG. 6 shows tables 601, 603 and 605 illustrating an example mapped RAID design for a storage pool. The table 601 shows an extreme performance storage tier with SAS flash drives of two types (denoted SAS flash 2 and SAS flash 3) in two RAID 5 groups with different stripe widths and numbers of drives. The table 603 shows a performance storage tier with SAS drives in a RAID 5 group. The table 605 shows a capacity storage tier with near line SAS (NL-SAS) drives in a RAID 6 group. Thus, in the mapped RAID configuration illustrated in FIG. 6, there are four disk types (SAS flash 2, SAS flash 3, SAS and NL-SAS) and there are four disk extent pools within the overall storage pool. Each extent pool contains one or more disk groups, which depend on the number of disks in the storage pool, and each disk group includes one or more data or RAID extents and one or more hot spare disk extents.

Figure 7:
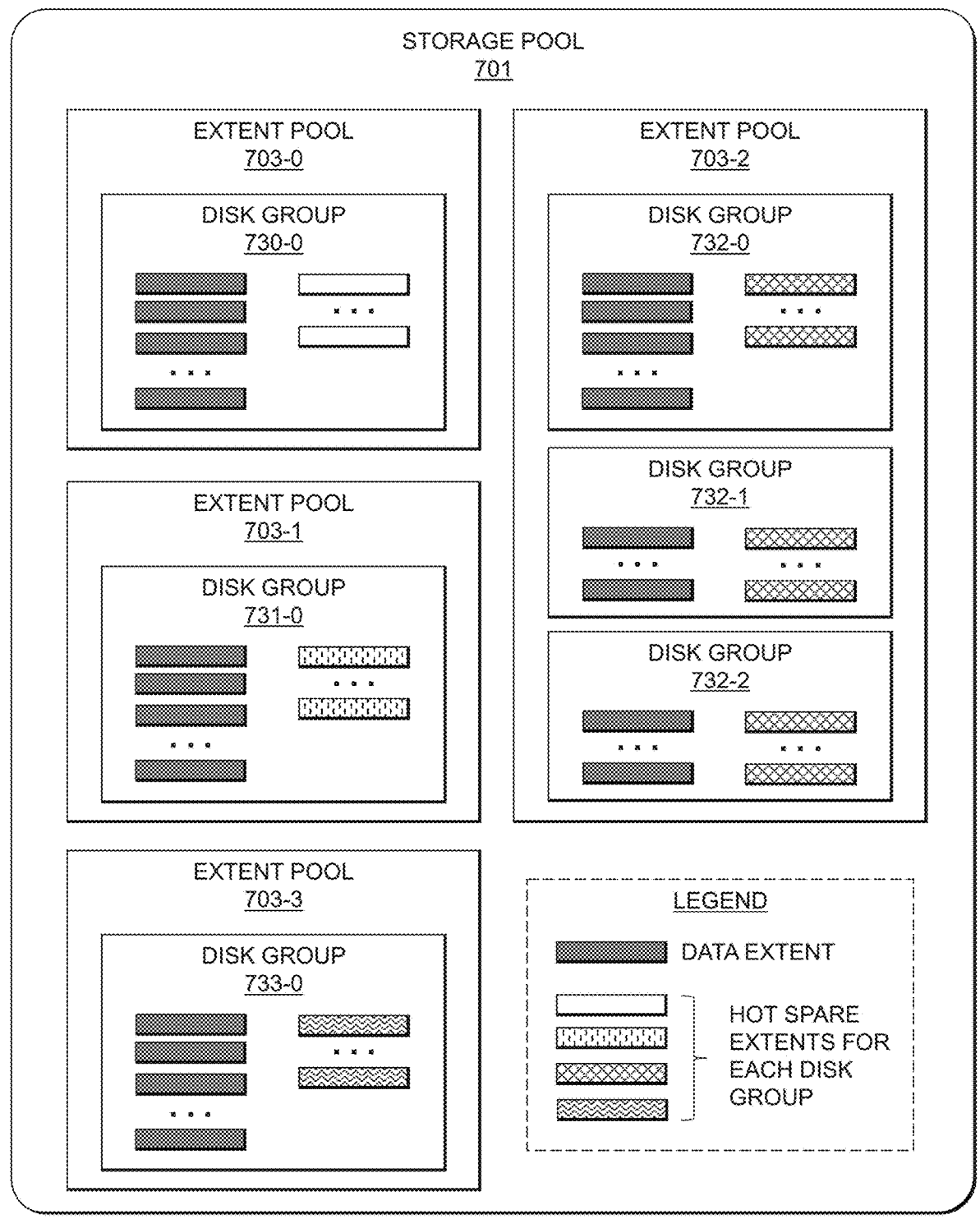
FIG. 7 shows a mapped redundant array of independent disks architecture for a storage pool with isolated hot spare extents in an illustrative embodiment.

FIG. 7 shows a configuration of a storage pool 701 with isolated hot spare extents across extent pools 703-0, 703-1, 703-2 and 703-3 (collectively, extent pools 703). Each of the extent pools 703 includes at least one disk group. The extent pool 703-0 includes disk group 730-0, the extent pool 703-1 includes disk group 731-1, the extent pool 703-2 includes disk groups 732-0, 732-1 and 732-2 (collectively, disk groups 732), and the extent pool 703-3 includes disk group 733-0. Each of the disk groups 730-0, 731-0, 732-0, 732-1, 732-2 and 733-0 includes a set of data extents and hot spare extents. As shown in FIG. 7, the hot spare extents are isolated among the disk groups 730-0, 731-0, 732-0, 732-1, 732-2 and 733-0. For example, only the hot spare extents which are part of the disk group 730-0 may be used for recovering a failed disk in the disk group 730-0. This is so even where an extent pool includes multiple disk groups with a same disk type, such as the extent pool 703-2, where only the hot spare extents of disk group 732-0 may be used for recovering a failed disk in the disk group 732-0 even though the disk groups 732-1 and 732-2 have hot spare extents of the same disk type.

Figure 8:
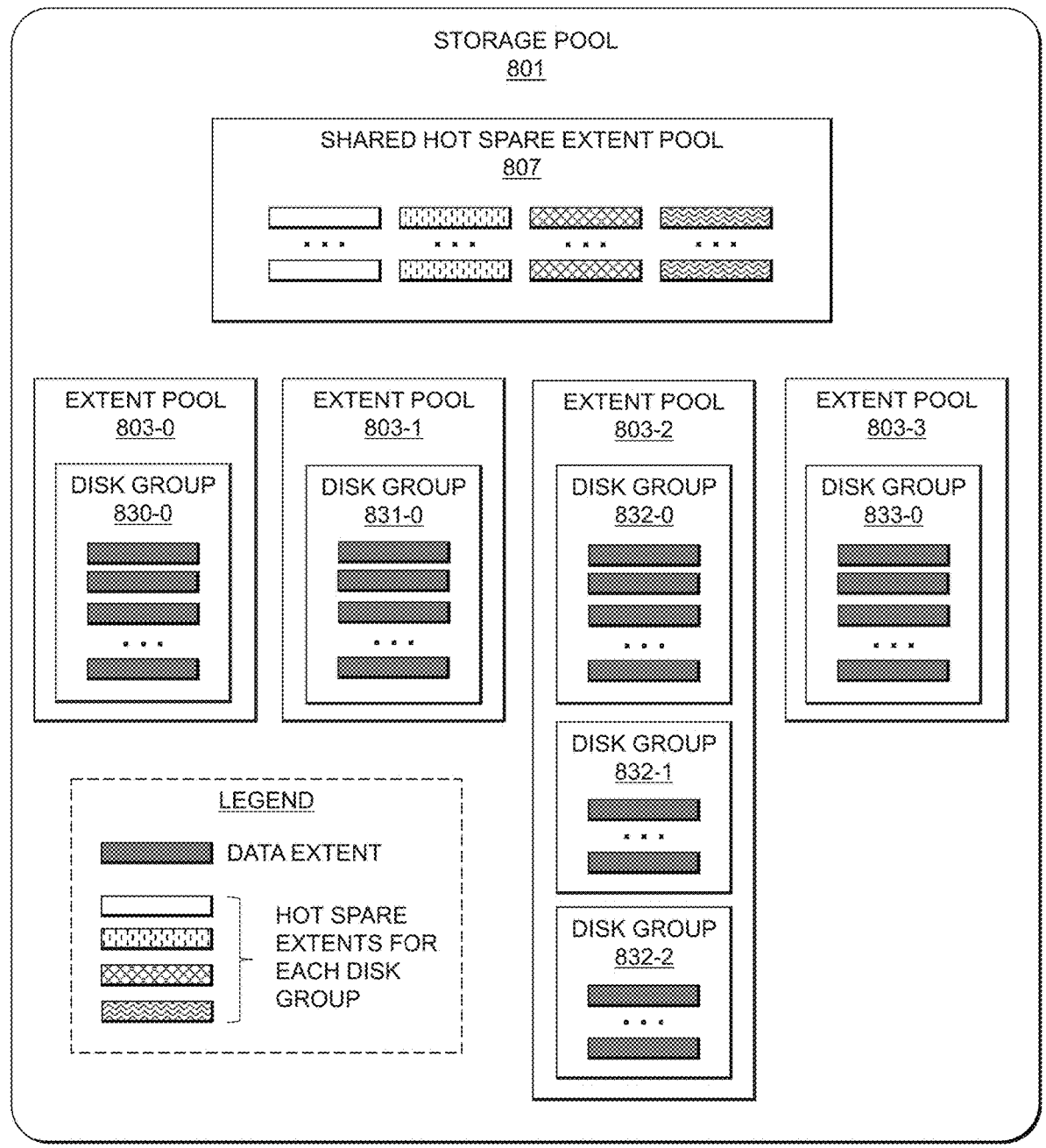
FIG. 8 shows a mapped redundant array of independent disks architecture for a storage pool with shared hot spare extents in an illustrative embodiment.

FIG. 8 shows a configuration of a storage pool 801 with shared hot spare extents across extent pools 803-0, 803-1, 803-2 and 803-3 (collectively, extent pools 803). Each of the extent pools 803 includes at least one disk group. The extent pool 803-0 includes disk group 830-0, the extent pool 803-1 includes disk group 831-0, the extent pool 803-2 includes disk groups 832-0, 832-1 and 832-2 (collectively, disk groups 832), and the extent pool 803-3 includes disk group 833-0. Each of the disk groups 830-0, 831-0, 832-0, 832-1, 832-2 and 833-0 includes a set of data extents, and contributes one or more hot spare extents that are made part of a shared hot spare extent pool 807. Although in this example each of the disk groups contributes one or more hot spare extents to the shared hot spare extent pool 807, in other embodiments one or more of the disk groups may not contribute any hot spare extents to the shared hot spare extent pool 807. Disk groups which do not contribute any hot spare extents to the shared hot spare extent pool 807 may still have access to the hot spare extents that are in the shared hot spare extent pool 807.

The hot spare extents in the shared hot spare extent pool 807 may be used for recovering a failed disk in any of the disk groups 830-0, 831-0, 832-0, 832-1, 832-2 and 833-0. As described in further detail below, an algorithm may be used for selecting which hot spare extents to use (e.g., for determining a prioritization of the hot spare extents in the shared hot spare extent pool 807 for recovering a given failed disk). While the shared hot spare extent pool 807 cannot resolve DU and/or DL caused by DFRG (e.g., the scenario of FIG. 4), it can improve reliability and reduce DU risk caused by disk failure after rebuild is completed and before a new disk is ready (e.g., the scenario of FIG. 5).

When the storage pool is created, the extent pools 803 and their associated disk groups with reserved disk extents and hot spare extents are created with the same policy as before the storage pool is built. Next, a hot spare extent pool class, the shared hot spare extent pool 807, is created in the storage pool 801. The shared hot spare extent pool 807 refreshes the hot spare extents as follows. The shared hot spare extent pool 807 contains all (or at least some) of the reserved hot spare extents of one or more of the disk groups 830-0, 831-0, 832-0, 832-1, 832-2 and 833-0 of one or more of the extent pools 803, and any remnant extents after building the RAIDs using the data extents of the disk groups 830-0, 831-0, 832-0, 832-1, 832-2 and 833-0. The shared hot spare extent pool 807 records the extent information for the hot spare extents without actually holding or using any of the hot spare extents. The extent information recorded in the shared hot spare extent pool 807 includes, for each hot spare extent in the shared hot spare extent pool 807: the extent group number of the extent pool and the disk group where that hot spare extent is located (e.g., an extent from the extent pool 803-1 and disk group 831-0 may have an extent group number of 1_0, an extent from the extent pool 803-2 and disk group 832-1 may have an extent group number of 2_1, etc.); the disk type of the that hot spare extent; the size of that hot spare extent; and the extent state of that hot spare extent (e.g., free, used, dead or end-of-life (EOL), etc.).

The shared hot spare extent pool 807 may be refreshed under various conditions or in response to various trigger events, such as when new disks are added or the storage pool 801 is expanded, when a disk in the storage pool 801 is faulted or reaches an EOL, when rebuilding is triggered for one of the disks in the storage pool 801, when a faulted/EOL disk is replaced with a new disk in the storage pool 801, etc. When the storage pool 801 is expanded, new disks may be of a same disk type as existing disks in the storage pool, or may be of a different disk type. For those with a different disk type, a new extent pool will be created with one or more new disk groups and RAIDs, and new hot spare extents will be added into the shared hot spare extent pool 807. For new disks with a same disk type as one or more existing disks of the storage pool 801, those new disks will join or be added to one of the existing extent pools 803 with the same disk type. One or more new RAIDs may be created, and new hot spare extents will be added into the shared hot spare extent pool 807. When a disk is faulted/EOL, the extent pool and disk group to which that disk belongs will refresh its disk extent state to dead/EOL and the shared hot spare extent pool 807 will update its corresponding extent information for the hot spare extents on the dead/EOL disk to the dead/EOL extent state.

Figure 9A:
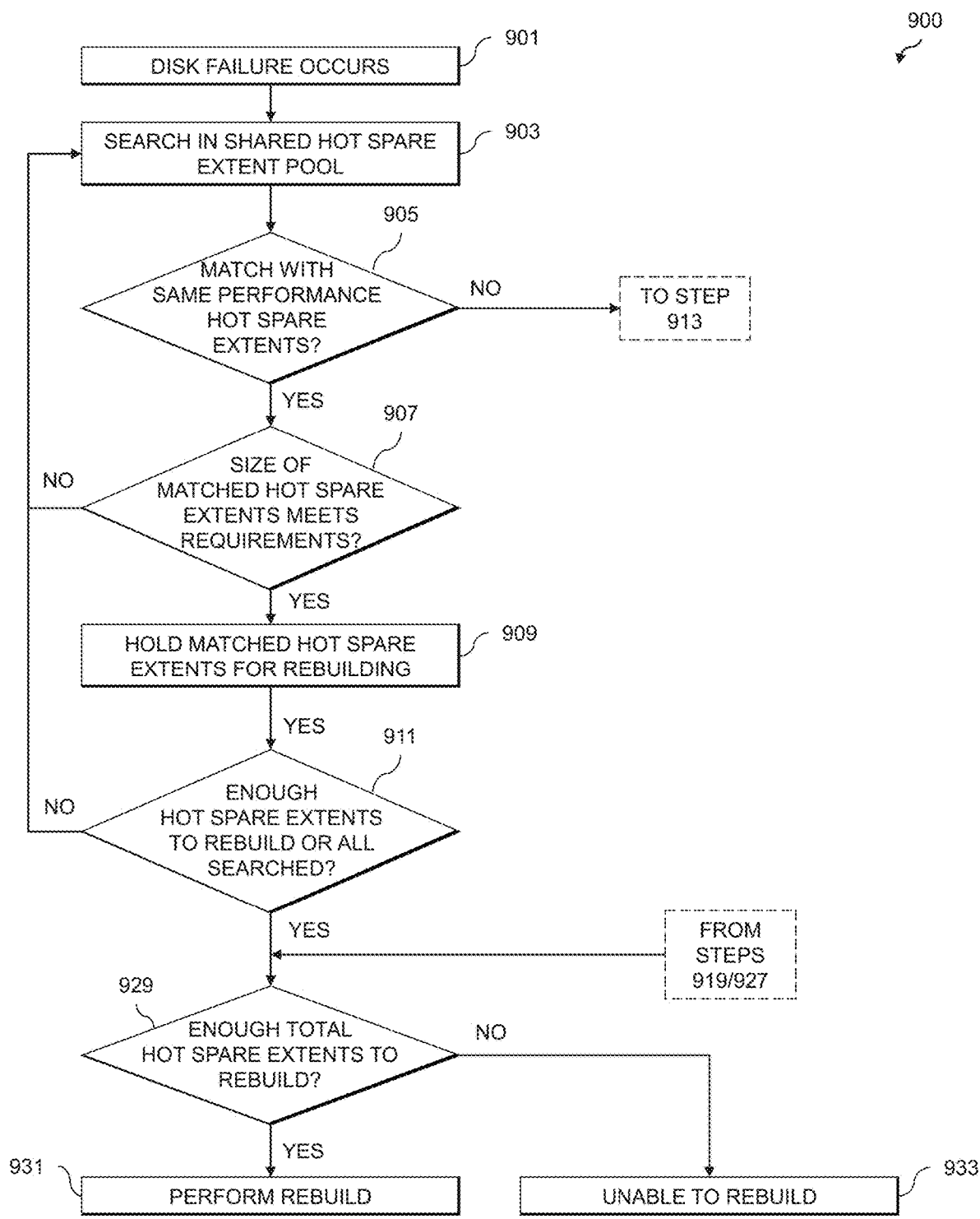
FIGS. 9A and 9B show a process flow for rebuilding failed disks in a mapped redundant array of independent disks architecture for a storage pool with shared hot spare extents in an illustrative embodiment.
Figure 9B:
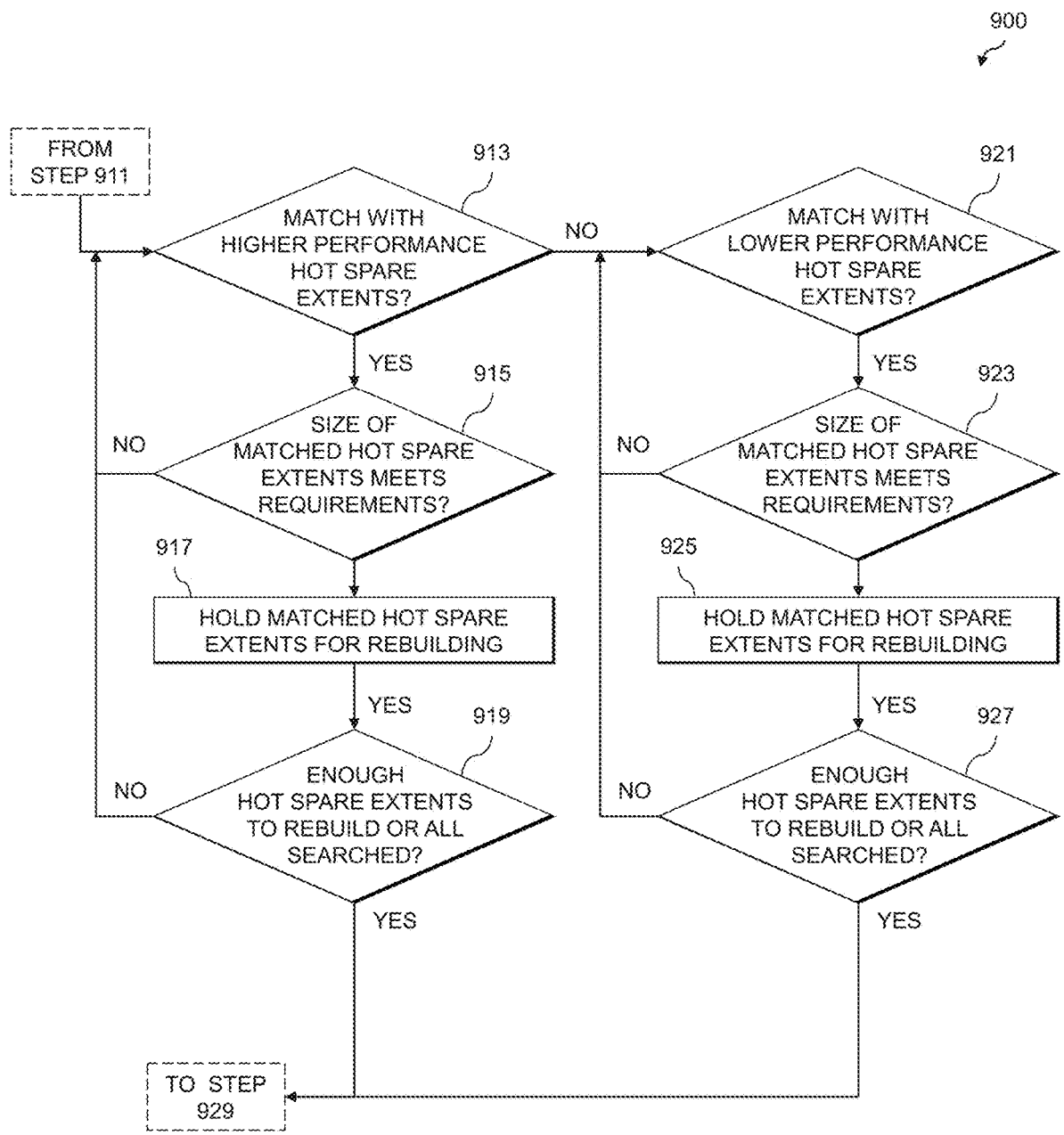

FIGS. 9A and 9B show a process flow 900 which is performed when rebuilding is triggered and hot spare extents of the shared hot spare extent pool 807 will be written with data. As shown in FIG. 9A, rebuilding is triggered in step 901 when a disk failure occurs. In step 903, a search of the shared hot spare extent pool 807 is conducted. In step 905, a determination is made as to whether there are any available hot spare extents in the shared hot spare extent pool 807 with the same extent pool and disk group identifier (ID) as the failed disk (e.g., with the same "performance" as the failed disk). If the result of the step 905 determination is yes, the process flow 900 proceeds to step 907 where a determination is made as to whether the size of the available hot spare extents in the shared hot spare extent pool 807 with the same extent pool and disk group ID meets the requirements for rebuilding data extents of the failed disk. If the result of the step 907 determination is yes, such available hot spare extents will be held for use in rebuilding the failed disk in step 909. In step 911, a determination is made as to whether the held hot spare extents are sufficient to rebuild the failed disk, or whether the search of the shared hot spare extent pool 807 for hot spare extents with the same extent pool and disk group ID as the failed disk is completed. If the result of the step 907 or step 911 determination is no, the process flow 900 returns to step 903. If the result of the step 905 determination is no, the process flow 900 proceeds to step 913 as shown in FIG. 9B.

In step 913, a determination is made as to whether there are any available hot spare extents in the shared hot spare extent pool 807 which have a "higher" performance than that of the failed disk. Consider, for example, the storage system configuration of FIG. 6. If a failed disk occurs in the capacity storage tier and there are no or insufficient hot spare extents available from disks in the capacity storage tier to rebuild the failed disk, then a search is made as to whether there are any hot spare extents available in the performance storage tier or the extreme performance storage tier. It should be noted that the search may begin with the next-highest performance storage tier, and continue to higher performance storage tiers only after exhausting the search of lower performance storage tiers. Thus, continuing with the example above, for rebuilding a failed disk in the capacity storage tier (where there are no or insufficient hot spare extents on disks in the capacity storage tier), hot spare extents from the performance storage tier will be selected before hot spare extents from the extreme performance storage tier. If the result of the step 913 determination is yes, the process flow 900 proceeds to step 915 where a determination is made as to whether the size of the available hot spare extents in the shared hot spare extent pool 807 with higher performance meet the requirements for rebuilding data extents of the failed disk. If the result of the step 915 determination is yes, such available hot spare extents will be held for use in rebuilding the failed disk in step 917. In step 919, a determination is made as to whether the hot spare extents held in step 917 (in combination with any hot spare extents held in step 909) are sufficient to rebuild the failed disk, or whether the search of the shared hot spare extent pool 807 for hot spare extents with higher performance is completed. If the result of the step 915 or step 919 determination is no, the process flow 900 returns to step 913. If the result of the step 913 determination is no, the process flow 900 proceeds to step 921.

In step 921, a determination is made as to whether there are any available hot spare extents in the shared hot spare extent pool 807 which have a "lower" performance than that of the failed disk. Consider, for example, the storage system configuration of FIG. 6. If a failed disk occurs in the extreme performance storage tier and there are no or insufficient hot spare extents available from disks in the extreme performance storage tier to rebuild the failed disk, then a search is made as to whether there are any hot spare extents available in the performance storage tier or the capacity storage tier. It should be noted that the search may begin with the next-lowest performance storage tier, and continue to lower performance storage tiers only after exhausting the search of higher performance storage tiers. Thus, continuing with the example above, for rebuilding a failed disk in the extreme performance storage tier (where there are no or insufficient hot spare extents on disks in the extreme performance storage tier), hot spare extents from the performance storage tier will be selected before hot spare extents from the capacity storage tier. If the result of the step 921 determination is yes, the process flow 900 proceeds to step 923 where a determination is made as to whether the size of the available hot spare extents in the shared hot spare extent pool 807 with lower performance meet the requirements for rebuilding data extents of the failed disk. If the result of the step 923 determination is yes, such available hot spare extents will be held for use in rebuilding the failed disk in step 925. In step 927, a determination is made as to whether the hot spare extents held in step 925 (in combination with any hot spare extents held in steps 909 and 917) are sufficient to rebuild the failed disk, or whether the search of the shared hot spare extent pool 807 for hot spare extents with lower performance is completed. If the result of the step 923 or step 927 determination is no, the process flow 900 returns to step 921. If the result of the step 911, step 919, or step 927 determination is yes, the process flow 900 proceeds to step 929 as shown in FIG. 9A.

Returning to FIG. 9A, in step 929 a determination is made as to whether there are enough total hot spare extents (held in steps 909, 917 and 925) to rebuild the failed disk. If the result of the step 929 determination is yes, rebuild of the failed disk is performed in step 931. If the result of the step 929 determination is no, the storage pool 801 is unable to rebuild the failed disk in step 933.

The rebuild process flow 900 illustrated in FIGS. 9A and 9B will first search within the shared hot spare extent pool 807 for hot spare extents with the same performance (e.g., the same extent pool and disk group ID) as the failed disk (e.g., steps 903 through 911). If there are sufficient hot spare extents with the same performance, such hot spare extents are used to rebuild the failed disk. If not, the shared hot spare extent pool 807 is searched for any hot spare extents with higher performance than the failed disk (e.g., steps 913 through 919). If there are sufficient hot spare extents with the same or higher performance, such hot spare extents are used to rebuild the failed disk. If not, the shared hot spare extent pool 807 is searched for any hot spare extents with lower performance than the failed disk (e.g., steps 921 through 927). If there are sufficient hot spare extents with the same, higher or lower performance, such hot spare extents are used to rebuild the failed disk. If not, the storage pool 801 is unable to rebuild the failed disk unless new disks are added to the storage pool 801. Such action may be triggered in response to the process flow 900 reaching step 933 (e.g., which can generate an alert or notification indicating that new disks are needed in the storage pool 801, which can automate the ordering and delivery of new disks, which can automate the addition of disks to the storage pool 801 from other storage pools, etc.). When the rebuilding condition is satisfied in step 931, the extent state information for any used hot spare extents is updated in the shared hot spare extent pool 807 after data is written thereto.

When the faulted/EOL disk is replaced, the extent information in the shared hot spare extent pool 807 will be updated by removing the extent information of the faulted/EOL disk, and splitting newly-added disks into extents some of which will be reserved for new hot spare extents added to the shared hot spare extent pool 807. It should be noted that in cases where mismatched hot spare extents are used to rebuild a failed disk (e.g., hot spare extents with higher or lower performance than that of the failed disk), when new disks are added to the storage pool 801 to replace the failed disk then such mismatched hot spare extents used to rebuild the failed disk may be freed (e.g., by copying data to the new disks). Such freeing of the mismatched hot spare extents may begin with freeing any higher performance hot spare extents which were used (starting from the highest performance) and then continuing with any lower performance hot spare extents which were used. This may be performed by comparing the disk type of newly-added extents with the used state of hot spare extents in the shared hot spare extent pool 807. If the extent type (e.g., performance) is the same as the replaced disk, then the data is kept on such hot spare extents and the extent information for such hot spare extents is removed from the shared hot spare extent pool 807. If the extent type (e.g., performance) is not the same as the replaced disk, the data on any such hot spare extents is moved to free data extents of the new disks and such hot spare extents are cleaned and their extent state information is set to free. Any new hot spare extents of the new disks are also added to the shared hot spare extent pool 807.

The reliability improvement provided through use of a shared hot spare extent pool (e.g., the shared hot spare extent pool 807) may be calculated as follows. For a storage system, assume that there are M disk groups with mapped RAID configuration, and that $DG_m$ is a disk group, where $1 \leq m \leq M$. Each disk group has a maximum of N disks, and each disk group has a number of disks $N_m$, where minimum number of disks needed for a RAID group $\leq N_m \leq N$. The $N_m$ disks of each disk group are divided into disk extents used for different RAID groups. $P_r$ may be used to denote the required reliability for a storage system or one or more disk groups thereof, which may be "five nines" or 99.999%.

Let a disk failure probability density function be p(t), where t is time. $C_{N_m}^i$ denotes the combination of $N_m$ disks in disk group $DG_m$ with i disk(s) failure, where $C_{N_m}^i$ is calculated according to:

$$C_{N_m}^i = \frac{N_m!}{(N_m - i)! \cdot i!} = \frac{N_m \cdot (N_m - 1) \cdot \ldots \cdot 1}{[(N_m - i)(N_m - i - 1) \cdot \ldots \cdot 1] \cdot [i \cdot (i - 1) \cdot \ldots \cdot 1]}$$

For a given time period T, the failure possibility is $$P(T) = \int_{t-\frac{T}{2}}^{t+\frac{T}{2}} p(t).$$

Normally, the disk failure time period T is rather small, compared with the whole disk warranty lifecycle denoted $T_w$ $$P(T) = \int_{t-\frac{T}{2}}^{t+\frac{T}{2}} p(t) \approx p(t).$$

$T_w$ may be, for example, 5 years. Thus, $$\left(e.g., T: \frac{T}{T_w} \approx 0\right).$$

As such, for any small time interval around time t, the failure possibility can be set as p(t).

Assume that the probability of a single disk failure in the warranty period $T_w$ is $P_f$. For the combination of $N_m$ disks, the probability of one disk failure in a disk group $DG_m$ in $T_w$ is determined according to:

$$P_{f\_1} = c_{N_m}^1 P_f^1 (1 - P_f)^{N_m - 1}$$

where $C_{N_m}^1$ denotes the combination of $N_m$ disks with one disk failure at a time.

The rebuilding period for a first failed disk is denoted $T_{rebuild}$ The probability of a second disk failure in the same disk group during the rebuilding time is determined according to:

$$P_{f\_2} = T_{rebuild} * c_{N_m-1}^1 * P_f^1 (1-P_f)^{N_m-2}$$

Assuming a RAID 5 configuration, this type of data loss cannot be resolved with the shared hot spare extent solution. If, however, another RAID configuration is used it may be possible to handle more than one disk failure (e.g., x disk failures) at once (e.g., for a RAID 6 configuration two disk failures can be handled at once). However, in such a configuration the x+1th disk failure during rebuild of the first x failed disks would not be able to be resolved using the shared hot spare extent technical solution. More generally, $P_{f\_r}$ denotes the x+1th disk failure possibility during the rebuilding time for x disks for a disk group with a RAID configuration that supports x simultaneous disk failures.

Figure 10:
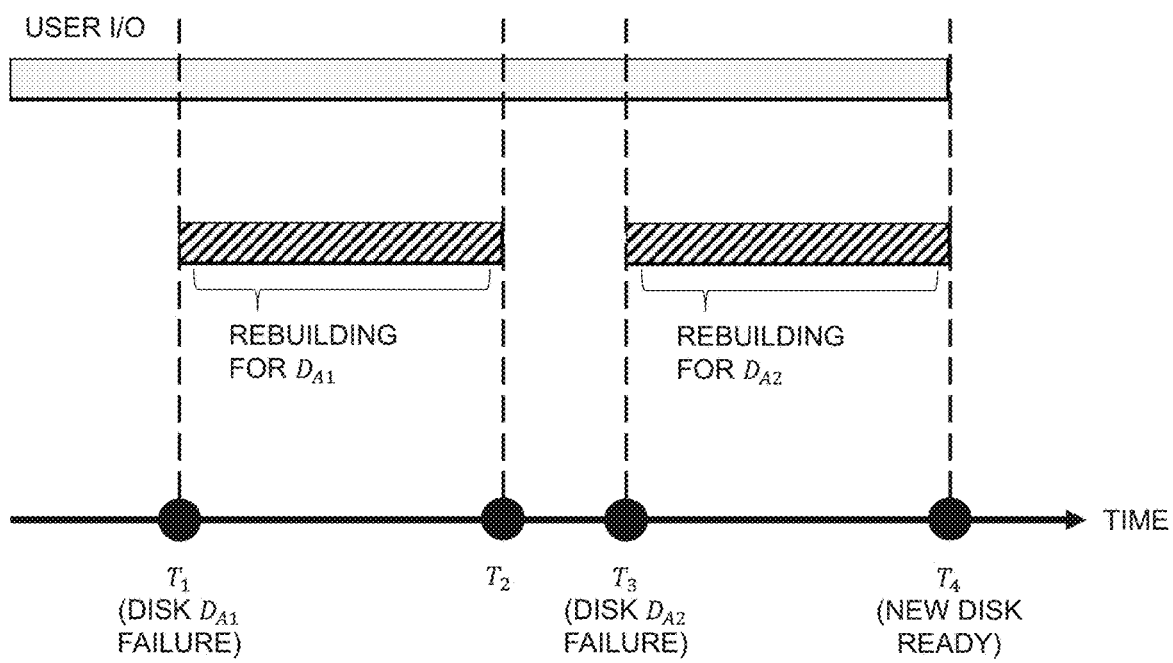
FIG. 10 shows a timing diagram plot of multiple disk failures and rebuilds using shared hot spare extents in an illustrative embodiment.

FIG. 10 shows a timing diagram plot 1000 illustrating a second disk failure which occurs after the rebuilding time window for a first disk failure, but before a new disk (e.g., a replacement for the first failed disk) is ready. In the plot 1000, disk $D_{A1}$ fails at time $T_1$, and has a rebuilding time window $T_2-T_1$. Here, the disk $D_{A2}$ fails at time $T_3$ which falls outside the rebuilding time window for disk $D_{A1}$ but before the new disk ready time $T_4$, where $T_{new}=T_4-T_2$. $T_{new}$ represents the time for a new disk to be ready to insert into the storage system to replace a failed disk, and may include disk purchase and delivery time. It should be noted that the scenario of FIG. assumes that a RAID 5 configuration is used where there is only enough hot spare capacity to recover a single disk failure. If another RAID configuration is used, such as a RAID 6 configuration, there may be capacity to recover multiple simultaneous disk failures.

For a multiple disk group storage system with a RAID configuration that supports x simultaneous disk failures, the x+1th disk failure which occurs after the x disks are rebuilt but before new replacement disks for the x failed disks are ready will result in the storage system being in a degraded status. This is a result of the hot spare space being consumed while the new disks are not ready for use. Where a shared hot spare extent pool is used for a multiple disk group storage system, it is possible to handle the x+1th disk failure in a given disk group after rebuild of the x failed disks and before new disks are ready to replace the x failed disks, as hot spare capacity of other disk groups may be used to handle the x+1th disk failure. Consider again a RAID 5 configuration, where x=1 and a second disk fails after rebuild of a first failed disk, but before a new disk is ready. In such a configuration, the probability of the second disk failure before the new disk is ready after the rebuild of the first disk is completed is determined according to:

$$P_{f\_n} = T_{new} * c_{N_m-1}^1 * P_f^1 (1-P_f)^{N_m-2}$$

Figure 11:
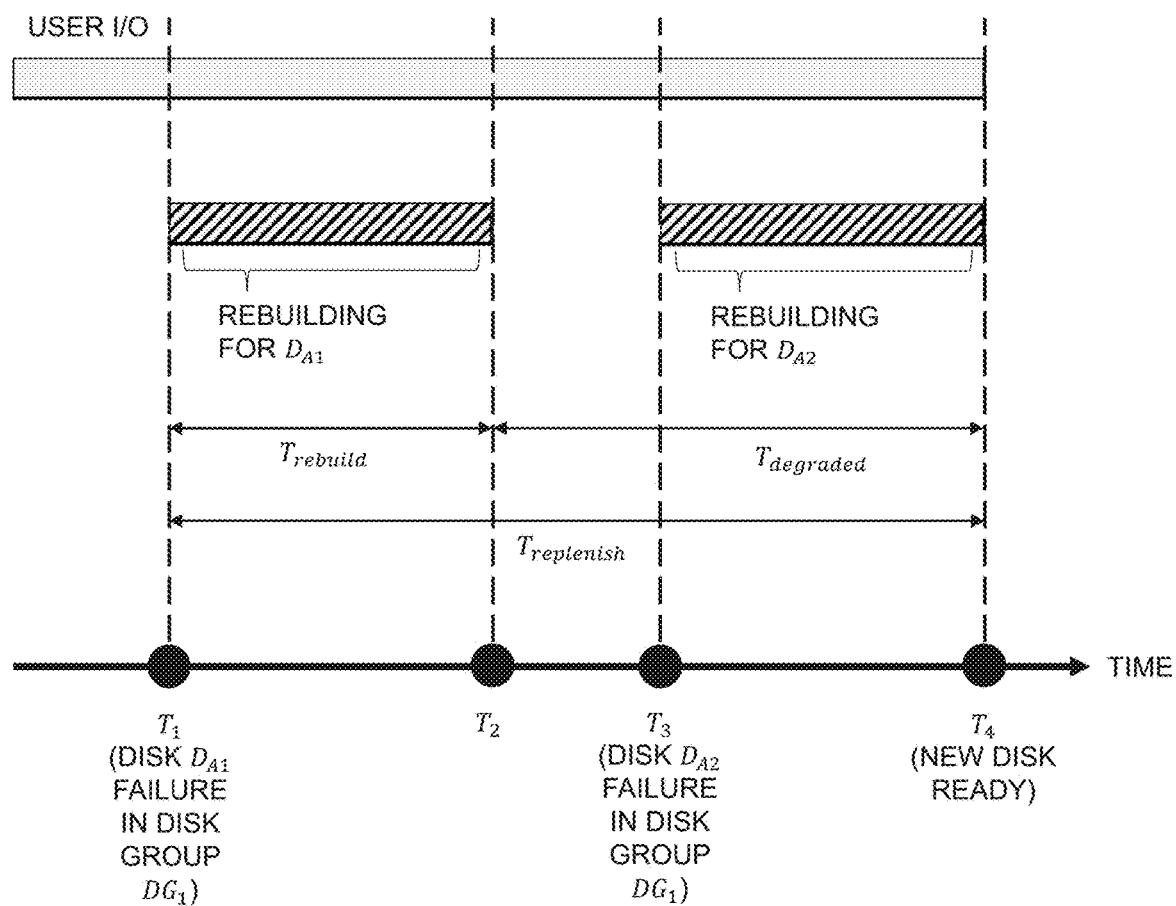
FIG. 11 shows a timing diagram plot of multiple disk failures and rebuilds in a disk group using shared hot spare extents before a new disk is ready for the disk group in an illustrative embodiment.

FIG. 11 shows a timing diagram plot 1100 illustrating a second disk failure which occurs after the rebuilding time window for a first disk failure, but before a new disk (e.g., a replacement for the first failed disk) is ready and where a shared hot spare extent pool is utilized. In the plot 1100, disk $D_{A1}$ in a given disk group $DG_1$ fails at time $T_1$, and has a rebuilding time window $T_2-T_1$. Here, the disk $D_{A2}$ also in the disk group $DG_1$ fails at time $T_3$ which falls outside the rebuilding time window for disk $D_{A1}$ but before the new disk ready time $T_4$, where $T_{new}=T_4-T_2$. Here, the disk $D_{A2}$ may be rebuilt using hot spare extents in the shared hot spare extent pool (e.g., hot spare extents on disks in other disk groups).

$RDG_{m,h}$ denotes a current hot spare capacity ratio for hot spare extents of disk group $DG_m$ (e.g., which may be $1/N_m$). For a storage system with one disk group, the DU ratio can be reduced by 0% (e.g., as there are no other disk groups contributing hot spare extents to the shared hot spare extent pool). For a storage system with more than one disk group, the shared hot spare extent pool can ensure that data availability in the situation that an x+1th disk fails in the same disk group (where the disk group uses a RAID configuration that supports x simultaneous disk failures), the DU ratio can be reduced. Again continuing with the example of a RAID 5 configuration (e.g., where x=1), the DU ratio reduction is determined according to:

$$\frac{T_{new}*P_{f\_n}*P_{at\ least\ one\ DG\ without\ disk\ failure}}{T_{new}*P_{f\_n}*\Sigma_{i=1}^{N_m-2} C_{N_m-1}^i P_{f\_1}^i} (N_m \geq 2)$$

Since the disks in a DG are of the same type and the disks' utilization is balanced, the failure probability among disks becomes higher as the disks age, which is captured by $P_{f\_1}$. The risk of DU caused by a second disk failure in a same disk group using a RAID 5 configuration (or more, generally, the x+1th simultaneous disk failure in a disk group that supports x simultaneous disk failures) also becomes higher over time. Further, the longer that a storage system (or one or more disk groups thereof) operates in a degraded state (e.g., as determined by $T_{new}$), the risk of DU will be higher.

A specific example will now be described with respect to a storage system including two disk groups denoted $DG_1$ and $DG_2$, where each of the disk groups has 32 disks and has a hot spare extent ratio $RDG_{m,h}=1/32$. Assume that there is one failed disk $D_{A1}$ in disk group $DG_1$ as illustrated in the timing diagram plot 1100 of FIG. 11, and that the rebuilding time for the failed disk, $T_{rebuild}=T_2=T_1$, is four hours, but the new disk replenishment time, $T_{replenish}=T_4-T_1$, is ten hours. Thus, once the rebuild of the failed disk $D_{A1}$ is completed, the storage system operates in a degraded state for time $T_{degraded}=T_4-T_2$ until the new disk is ready at time $T_4$. In this example, the storage system is in a degraded status for 6 hours, and during the time period $T_{degraded}$ any disk failure in the same disk group $DG_1$ would cause DU if isolated hot spare extents are used. The technical solutions described herein which provide a shared hot spare extent pool for the disk groups $DG_1$ and $DG_2$ can reduce the possibility of DU during the six hour $T_{degraded}$ time period in the event of failure of the second disk $D_{A2}$ in the disk group $DG_1$ at time $T_3$.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for implementing a mapped RAID configuration with multiple disk groups and a shared pool of hot spare extents will now be described in greater detail with reference to FIGS. 12 and 13. Although described in the context of system 100, these platforms may also be used to implement at least portions of other information processing systems in other embodiments.

Figure 12:
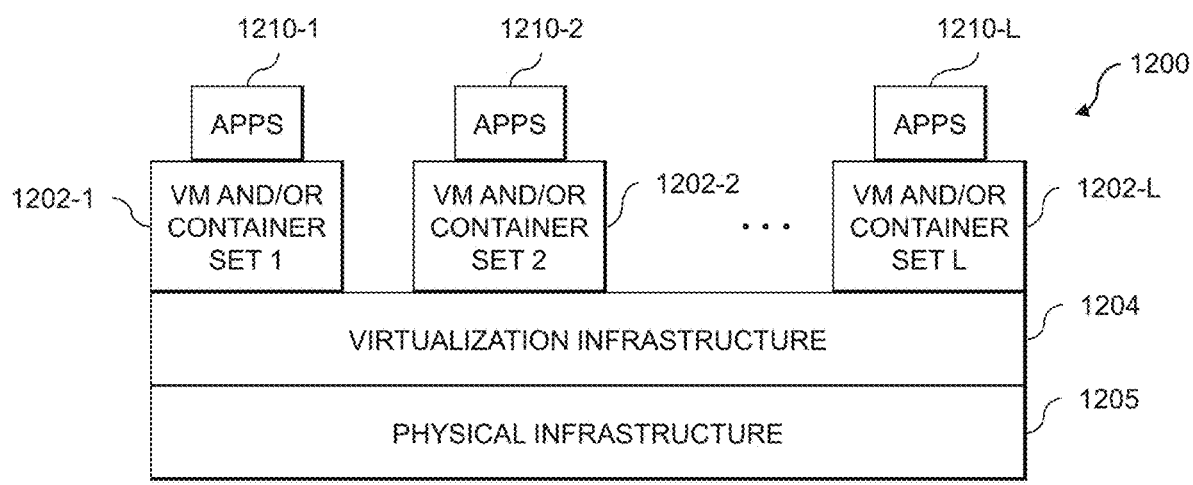
FIGS. 12 and 13 show examples of processing platforms that may be utilized to implement at least a portion of an information processing system in illustrative embodiments.
Figure 13:
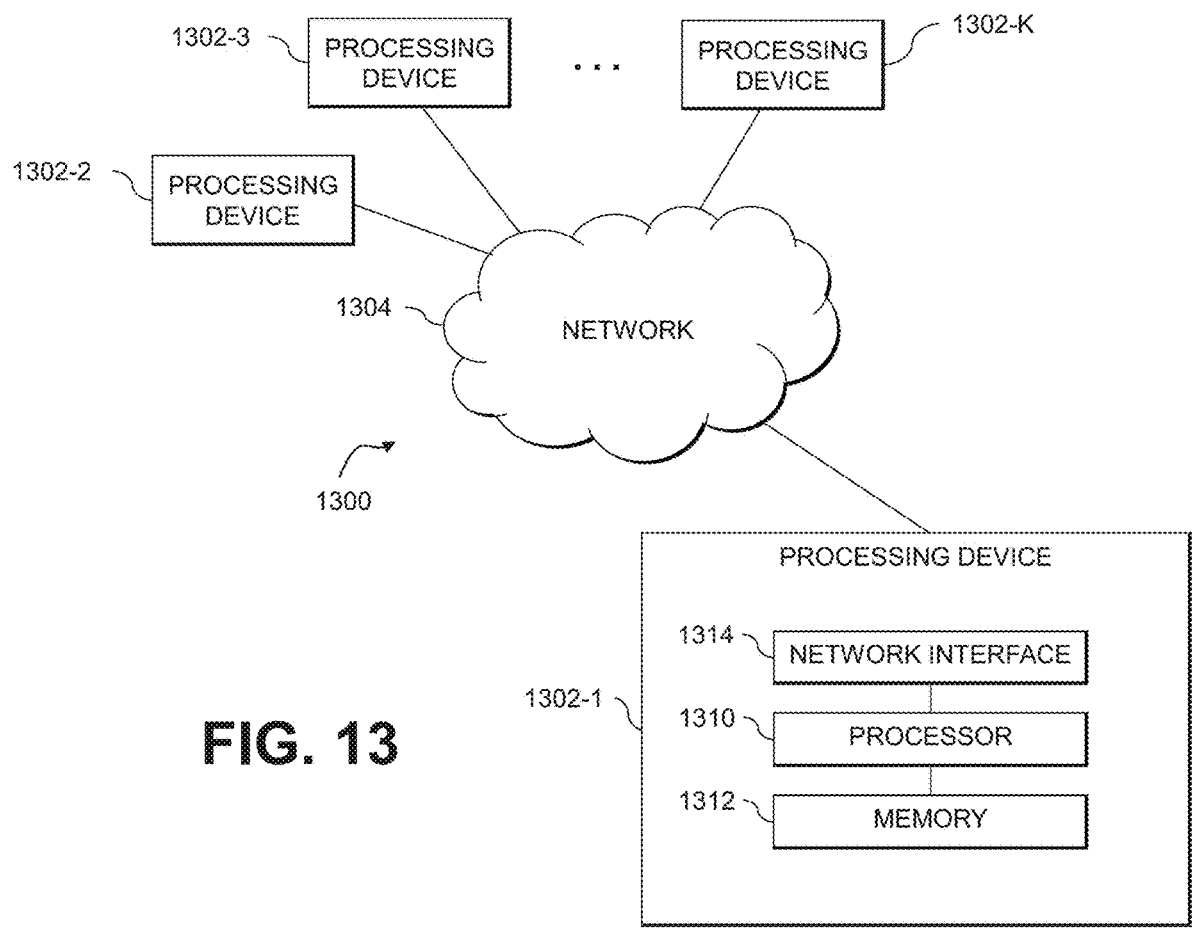

FIG. 12 shows an example processing platform comprising cloud infrastructure 1200. The cloud infrastructure 1200 comprises a combination of physical and virtual processing resources that may be utilized to implement at least a portion of the information processing system 100 in FIG. 1. The cloud infrastructure 1200 comprises multiple virtual machines (VMs) and/or container sets 1202-1, 1202-2, . . . 1202-L implemented using virtualization infrastructure 1204. The virtualization infrastructure 1204 runs on physical infrastructure 1205, and illustratively comprises one or more hypervisors and/or operating system level virtualization infrastructure. The operating system level virtualization infrastructure illustratively comprises kernel control groups of a Linux operating system or other type of operating system.

The cloud infrastructure 1200 further comprises sets of applications 1210-1, 1210-2, . . . 1210-L running on respective ones of the VMs/container sets 1202-1, 1202-2, . . . 1202-L under the control of the virtualization infrastructure 1204. The VMs/container sets 1202 may comprise respective VMs, respective sets of one or more containers, or respective sets of one or more containers running in VMs.

In some implementations of the FIG. 12 embodiment, the VMs/container sets 1202 comprise respective VMs implemented using virtualization infrastructure 1204 that comprises at least one hypervisor. A hypervisor platform may be used to implement a hypervisor within the virtualization infrastructure 1204, where the hypervisor platform has an associated virtual infrastructure management system. The underlying physical machines may comprise one or more distributed processing platforms that include one or more storage systems.

In other implementations of the FIG. 12 embodiment, the VMs/container sets 1202 comprise respective containers implemented using virtualization infrastructure 1204 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1200 shown in FIG. 12 may represent at least a portion of one processing platform. Another example of such a processing platform is processing platform 1300 shown in FIG. 13.

The processing platform 1300 in this embodiment comprises a portion of system 100 and includes a plurality of processing devices, denoted 1302-1, 1302-2, 1302-3, . . . 1302-K, which communicate with one another over a network 1304.

The network 1304 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1302-1 in the processing platform 1300 comprises a processor 1310 coupled to a memory 1312.

The processor 1310 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1312 may comprise random access memory (RAM), read-only memory (ROM), flash memory or other types of memory, in any combination. The memory 1312 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for implementing a mapped RAID configuration with multiple disk groups and a shared pool of hot spare extents as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:

at least one processing device comprising a processor coupled to a memory;

the at least one processing device being configured to perform steps of:

maintaining, for a storage system implementing a mapped redundant array of independent disks (RAID) configuration including two or more disk groups each providing one or more RAID groups comprising one or more data extents and one or more hot spare extents, a shared pool of hot spare extents, the shared pool of hot spare extents comprising a first set of hot spare extents on one or more disks in a first one of the two or more disk groups and a second set of hot spare extents on one or more disks in a second one of the two or more disk groups;

detecting failure of a given disk in the first disk group;

determining whether available ones of the first set of hot spare extents in the shared pool of hot spare extents provide sufficient storage capacity for rebuilding the given disk;

responsive to determining that available ones of the first set of hot spare extents in the shared pool of hot spare extents do not provide sufficient storage capacity for rebuilding the given disk, selecting one or more of the second set of hot spare extents for rebuilding the given disk; and rebuilding the given disk utilizing at least the selected one or more of the second set of hot spare extents in the shared pool of hot spare extents;

wherein the first disk group provides storage for a first one of a plurality of storage tiers of the storage system, the first storage tier providing a first level of performance;

wherein the second disk group provides storage for a second one of the plurality of storage tiers of the storage system, the second storage tier providing a second level of performance, the second level of performance being different than the first level of performance;

wherein, if the second level of performance provided by the second storage tier of the storage system is a higher level of performance than the first level of performance provided by the first storage tier of the storage system, selecting the one or more of the second set of hot spare extents for rebuilding the given disk is further responsive to determining that the shared pool of hot spare extents does not include any available hot spare extents on any of the two or more disk groups providing storage for one or more of the plurality of storage tiers of the storage system that provides a given level of performance that is greater than the first level of performance and less than the second level of performance; and wherein, if the second level of performance provided by the second storage tier of the storage system is a lower level of performance than the first level of performance provided by the first storage tier of the storage system, selecting the one or more of the second set of hot spare extents for rebuilding the given disk is further responsive to determining that the shared pool of hot spare extents does not include any available hot spare extents on any of the two or more disk groups providing storage for one or more of the plurality of storage tiers of the storage system that provides a given level of performance that is less than the first level of performance and greater than the second level of performance.

2. The apparatus of claim 1 wherein the at least one processing device is further configured to perform steps of:

detecting addition of one or more disks to the first disk group; and migrating rebuilt data stored on the selected one or more of the second set of hot spare extents in the shared pool of hot spare extents to the one or more disks added to the first disk group.

3. The apparatus of claim 1 wherein rebuilding the given disk further utilizes at least one available one of the first set of hot spare extents in the shared pool of hot spare extents.

4. The apparatus of claim 1 wherein rebuilding the given disk further utilizes at least one of a third set of hot spare extents on one or more disks in a third one of the two or more disk groups.

5. The apparatus of claim 4 wherein the third disk group provides storage for a third one of the plurality of storage tiers of the storage system.

6. The apparatus of claim 1 wherein the first disk group comprises one or more RAID groups configured to recover a designated number of simultaneous disk failures.

7. The apparatus of claim 6 wherein detecting the failure of the given disk in the first disk group comprises detecting failure of the given disk (i) following rebuild of the designated number of failed disks in the first disk group and (ii) prior to replacement of the designated number of failed disks in the first disk group of the storage system.

8. The apparatus of claim 1 wherein the two or more disk groups are arranged in two or more extent pools, the two or more extent pools providing different storage system performance.

9. The apparatus of claim 8 wherein the two or more extent pools are associated with different ones of the plurality of storage tiers of the storage system.

10. A computer program product comprising a non-transitory processor-readable storage medium having stored therein program code of one or more software programs, wherein the program code when executed by at least one processing device causes the at least one processing device to perform steps of:

maintaining, for a storage system implementing a mapped redundant array of independent disks (RAID) configuration including two or more disk groups each providing one or more RAID groups comprising one or more data extents and one or more hot spare extents, a shared pool of hot spare extents, the shared pool of hot spare extents comprising a first set of hot spare extents on one or more disks in a first one of the two or more disk groups and a second set of hot spare extents on one or more disks in a second one of the two or more disk groups;

detecting failure of a given disk in the first disk group;

determining whether available ones of the first set of hot spare extents in the shared pool of hot spare extents provide sufficient storage capacity for rebuilding the given disk;

responsive to determining that available ones of the first set of hot spare extents in the shared pool of hot spare extents do not provide sufficient storage capacity for rebuilding the given disk, selecting one or more of the second set of hot spare extents for rebuilding the given disk; and rebuilding the given disk utilizing at least the selected one or more of the second set of hot spare extents in the shared pool of hot spare extents;

wherein the first disk group provides storage for a first one of a plurality of storage tiers of the storage system, the first storage tier providing a first level of performance;

wherein the second disk group provides storage for a second one of the plurality of storage tiers of the storage system, the second storage tier providing a second level of performance, the second level of performance being different than the first level of performance;

wherein, if the second level of performance provided by the second storage tier of the storage system is a higher level of performance than the first level of performance provided by the first storage tier of the storage system, selecting the one or more of the second set of hot spare extents for rebuilding the given disk is further responsive to determining that the shared pool of hot spare extents does not include any available hot spare extents on any of the two or more disk groups providing storage for one or more of the plurality of storage tiers of the storage system that provides a given level of performance that is greater than the first level of performance and less than the second level of performance; and wherein, if the second level of performance provided by the second storage tier of the storage system is a lower level of performance than the first level of performance provided by the first storage tier of the storage system, selecting the one or more of the second set of hot spare extents for rebuilding the given disk is further responsive to determining that the shared pool of hot spare extents does not include any available hot spare extents on any of the two or more disk groups providing storage for one or more of the plurality of storage tiers of the storage system that provides a given level of performance that is less than the first level of performance and greater than the second level of performance.

11. The computer program product of claim 10 wherein rebuilding the given disk further utilizes at least one of a third set of hot spare extents on one or more disks in a third one of the two or more disk groups.

12. The computer program product of claim 11 wherein the third disk group provides storage for a third one of the plurality of storage tiers of the storage system.

13. A method comprising:
maintaining, for a storage system implementing a mapped redundant array of independent disks (RAID) configuration including two or more disk groups each providing one or more RAID groups comprising one or more data extents and one or more hot spare extents, a shared pool of hot spare extents, the shared pool of hot spare extents comprising a first set of hot spare extents on one or more disks in a first one of the two or more disk groups and a second set of hot spare extents on one or more disks in a second one of the two or more disk groups;

detecting failure of a given disk in the first disk group;

determining whether available ones of the first set of hot spare extents in the shared pool of hot spare extents provide sufficient storage capacity for rebuilding the given disk;

responsive to determining that available ones of the first set of hot spare extents in the shared pool of hot spare extents do not provide sufficient storage capacity for rebuilding the given disk, selecting one or more of the second set of hot spare extents for rebuilding the given disk; and rebuilding the given disk utilizing at least the selected one or more of the second set of hot spare extents in the shared pool of hot spare extents;

wherein the first disk group provides storage for a first one of a plurality of storage tiers of the storage system, the first storage tier providing a first level of performance;

wherein the second disk group provides storage for a second one of the plurality of storage tiers of the storage system, the second storage tier providing a second level of performance, the second level of performance being different than the first level of performance;

wherein, if the second level of performance provided by the second storage tier of the storage system is a higher level of performance than the first level of performance provided by the first storage tier of the storage system, selecting the one or more of the second set of hot spare extents for rebuilding the given disk is further responsive to determining that the shared pool of hot spare extents does not include any available hot spare extents on any of the two or more disk groups providing storage for one or more of the plurality of storage tiers of the storage system that provides a given level of performance that is greater than the first level of performance and less than the second level of performance;

wherein, if the second level of performance provided by the second storage tier of the storage system is a lower level of performance than the first level of performance provided by the first storage tier of the storage system, selecting the one or more of the second set of hot spare extents for rebuilding the given disk is further responsive to determining that the shared pool of hot spare extents does not include any available hot spare extents on any of the two or more disk groups providing storage for one or more of the plurality of storage tiers of the storage system that provides a given level of performance that is less than the first level of performance and greater than the second level of performance; and wherein the method is performed by at least one processing device comprising a processor coupled to a memory.

14. The method of claim 13 wherein rebuilding the given disk further utilizes at least one of a third set of hot spare extents on one or more disks in a third one of the two or more disk groups.

15. The method of claim 14 wherein the third disk group provides storage for a third one of the plurality of storage tiers of the storage system.

16. The method of claim 13 wherein rebuilding the given disk further utilizes at least one of a third set of hot spare extents on one or more disks in a third one of the two or more disk groups.

17. The method of claim 13 wherein the first disk group comprises one or more RAID groups configured to recover a designated number of simultaneous disk failures.

18. The method of claim 17 wherein detecting the failure of the given disk in the first disk group comprises detecting failure of the given disk (i) following rebuild of the designated number of failed disks in the first disk group and (ii) prior to replacement of the designated number of failed disks in the first disk group of the storage system.

19. The method of claim 13 wherein the two or more disk groups are arranged in two or more extent pools, the two or more extent pools providing different storage system performance.

20. The method of claim 19 wherein the two or more extent pools are associated with different ones of the plurality of storage tiers of the storage system.

* * * * *